Dec. 21, 1965  F. S. BILLINGSLEY  3,224,432
DEVICE FOR IRRADIATING A BODY CAVITY
Filed April 10, 1963  2 Sheets-Sheet 1
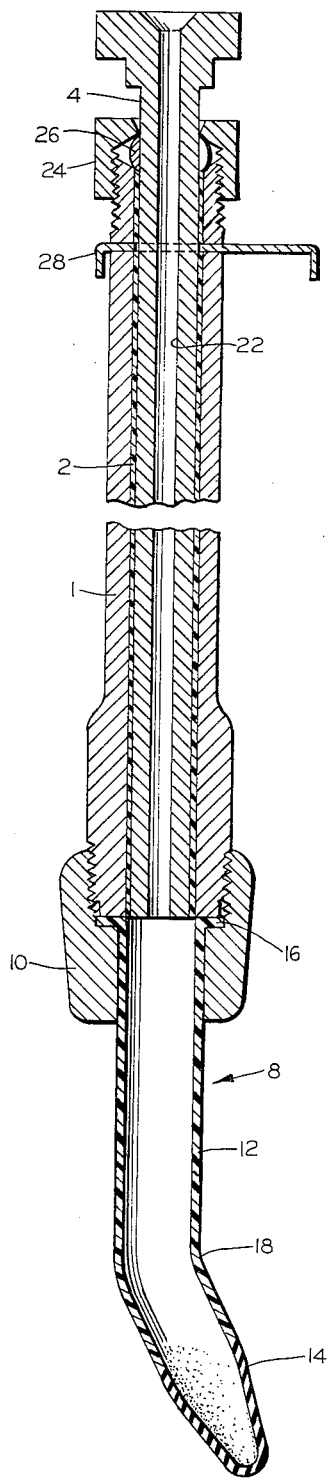
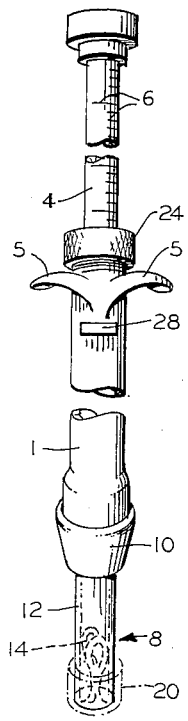
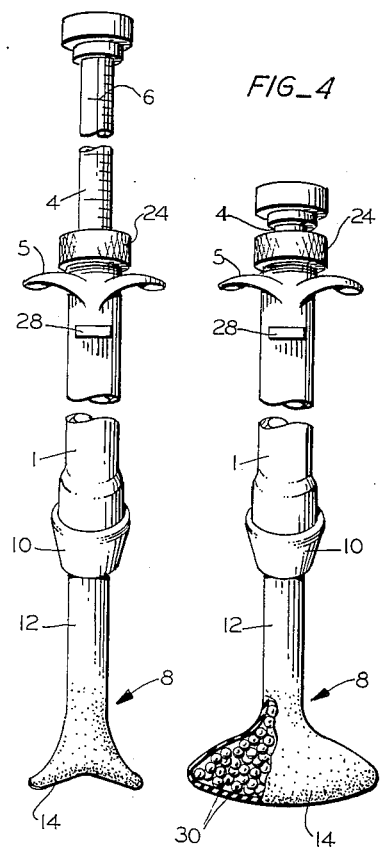
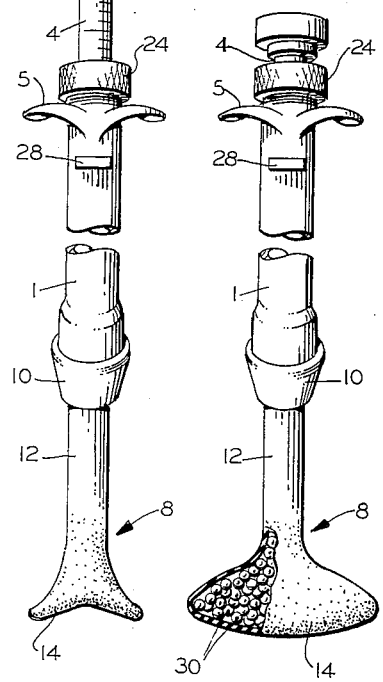
INVENTOR.
FRANK S. BILLINGSLEY
BY
ATTORNEY Dec. 21, 1965 F. S. BILLINGSLEY 3,224,432
DEVICE FOR IRRADIATING A BODY CAVITY
Filed April 10, 1963 2 Sheets-Sheet 2
FIG_5
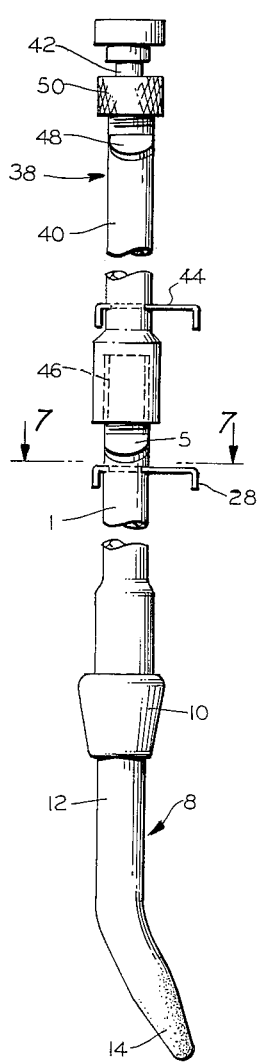
FIG_6
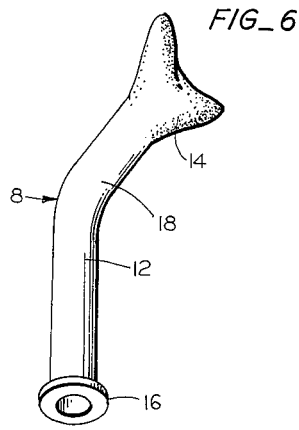
FIG_7
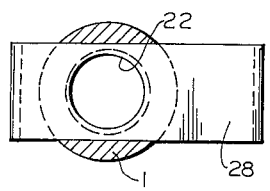
FIG_8
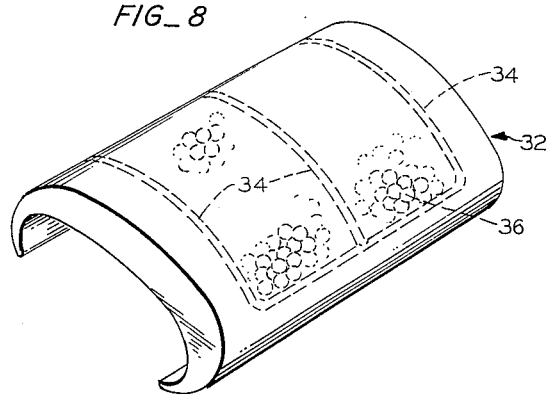
FIG_9
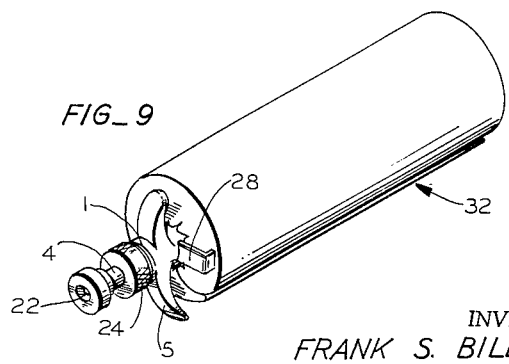
INVENTOR.
FRANK S. BILLINGSLEY
BY
Paul M. Klein Jr.
ATTORNEY 3,224,432
DEVICE FOR IRRADIATING A BODY CAVITY
Frank S. Billingsley, United States Navy
(13116 Valley Wood Court, Silver Spring, Md.)
Filed Apr. 10, 1963, Ser. No. 272,170
11 Claims. (Cl. 128—1.2)

(Granted under Title 35, U.S. Code (1952), sec. 266)

The invention described herein may be manufactured and used by or for the Government of the United States of America for governmental purposes without the payment of any royalties thereon or therefor.

This invention relates to a device for irradiating a cavity, more particularly an endometrial cavity.

The present methods and instruments available for treating diseases of body cavities, particularly for treating endometrial carcinoma, are considered by many to be unreliable and makeshift. They fail to distribute a uniform dose of radiation to the cavity. By way of illustration, the Heyman technique of multiple intrauterine radium sources utilized in two separate applications is presently the most frequently advocated. This consists of packing the endometrial cavity with small ovoid radium sources, one by one, until the operator thinks the cavity is filled. These ovoids of radium are attached to long wire strands which are removed in reverse order after an "adequate" dosage is given to the patient. This method is time consuming, unreliable, and fails to deliver a uniform dosage of radiation to the endometrial cavity, thereby giving inadequate radiation therapy.

An object of the present invention is to provide a method, and a device easy to insert, to maintain a uniform dose of radiation in a body cavity such as an endometrial cavity, in order to adequately treat a disease such as endometrial carcinoma.

Other objects, advantages and novel features of the invention will become apparent from the following detailed description when considered in conjunction with the accompanying drawings wherein:

FIG. 1 is a longitudinal cross-section of a preferred embodiment of the device of the present invention;

FIG. 2 is a plan view of the device of FIG. 1 partly broken away and showing the instrument preparatory for insertion in the uterine cavity;

FIG. 3 is a plan view of the device of FIG. 2 showing the balloon semi-expanded after insertion in the uterine cavity;

FIG. 4 is a plan view of the device of FIG. 2 showing the balloon expanded within the endometrial cavity and partly broken away to show radioactive pellets filling the applicator;

FIG. 5 is a plan view of the device of FIG. 1 with an extension attached to it and providing an additional supply of radioactive material;

FIG. 6 is a plan view of a preferred form of applicator used with the device of FIG. 1 and shown with its balloon portion partially expanded;

FIG. 7 is a cross-section taken along the line 7—7 in FIG. 5 illustrating the gate for controlling the passage of radioactive material;

FIG. 8 is an axonometric view of a clamp-on radiation protector or envelope, shown in expanded configuration, and adapted to clamp on the device of FIGS. 1 and 5 for protecting the operator; and FIG. 9 is an assembly view showing the envelope of FIG. 8 in engagement with the storage cylinder of the device of FIG. 1.

Reference is now made to the drawing.

Numeral 1 indicates a cylinder or barrel lined, if desired, with an anti-friction lining 2 of nylon or the like. This cylinder together with its graduated plunger 4 constitutes generally a syringe. Finger holders 5 facilitate handling the device. The indicia 6, distributed along the length of the plunger, indicate the extent of its insertion in the cylinder. An applicator generally indicated at 8 is fastened to the distal end of the cylinder 1 by any convenient means such as a threaded collar 10. The applicator 8 in one preferred illustrated embodiment is formed of a rigid tubular stem 12, of hard rubber, plastic, or the like, integral with which is a distensible, elastic balloon 14. The applicator is conveniently provided with a flange 16 to insure its accurate attachment to the distal end of the cylinder 1 so that the tubular stem is coaxial with and in communication with the interior of the cylinder 1. The distal portion 18 of the rigid stem is so oriented that its axis forms an obtuse angle with the axis of the proximal portion of the stem. The balloon 14, of strong latex or the like, preferably designed to withstand say 10 times the maximum load to be used, is generally T-shaped to facilitate its conforming closely to the contour of an endometrial cavity. The balloon can be readily invaginated within the stem portion of the applicator as shown in FIG. 2 and held in such position by means of a removable cap 20.

The plunger 4 is preferably provided with a small hole 22 extending lengthwise through the plunger to facilitate escape of air when the plunger is depressed and to facilitate admission of air, water, or other fluid if desired to inflate the balloon 14. The hole may be of the order of less than $\frac{1}{32}$ or $\frac{1}{16}$ of an inch in diameter. Means, conveniently in the form of a knurled collar 24 and locking washer 26, are provided for locking the plunger 4 at various positions of travel against motion in the cylinder 1. A slidable gate 28 (FIGS. 1 and 7) serves to close the bore of the cylinder 1 when the plunger 4 has been retracted past the gate.

Pellets or other solid particles of radioactive material such as radioactive cobalt are used to expand the balloon 14 against the interior of the uterine cavity to be irradiated. These pellets are of any convenient small diameter larger than the diameter of the hole 22. They may be, say, of the order of $\frac{1}{8}''$ in diameter. To protect the operator against radiation from the radioactive material, a clamp-on radiation protector or envelope 32 can be used. This is conveniently made of a hollow spring steel frame, generally indicated at 34, filled with material such as lead shot 36, relatively opaque to radiation. The envelope is preformed so as to tend to curl itself around into a cylindrical shape when released from its extended configuration shown in FIG. 8. In FIG. 9 the envelope 32 is shown clamping itself around the cylinder 1 forming a protective radiation shield.

For use in cases requiring more radioactive material than can be stored in the cylinder 1, there is provided an extension generally indicated at 38 and including an extension cylinder 40 with a mating plunger 42 and a sliding gate 44. Means for attaching the extension cylinder to the cylinder 1 may be simply in the form of a threaded portion 46 which can screw onto the proximal end of the cylinder 1 in place of knurled collar 24. Extension cylinder 40 is preferably provided with finger holders 48 essentially identical with those shown at 5 on the storage cylinder 1.

Similarly, the extension cylinder is provided with a knurled locking collar 50 similar to collar 24 for locking the plunger 42 against motion relative to the cylinder 40. The cylinders, plungers, knurled collars and gates are made of any suitable strong, readily sterilizable material. Stainless steel has been found to be quite adequate.

In using the device and carrying out the method of the invention, an applicator 8, most nearly fitting the anatomy of the particular patient, is chosen from perhaps three varieties having angles of say 15°, 25°, and 40° to accommodate different angles of the uterus with the vagina. Applicators are made with different balloon sizes to conform to all sizes of endometrial cavities. The applicators are normally used only one time and discarded. The applicator is assembled to the cylinder in the manner shown in FIG. 1. With the plunger 4 removed from the cylinder 1 and the gate 28 in open position, the cylinder is ready for loading with solid particles of radioactive material such as pellets 30.

Prior to the loading of the pellets, the uterus will have been sounded and the size of the endometrial cavity estimated fairly accurately. If the size is difficult to determine by this method, then a measured quantity of sterilized water would be forced into the cavity in a balloon such as 14, under pressure to determine the exact size of the cavity. From this knowledge of the size of the cavity, the number of pellets required is determined.

This required number of pellets is loaded into the cylinder 1 after the balloon 14 has been invaginated within the rigid stem 12 and held therein by removable cap 20 as shown in FIG. 2. Dummy pellets of non-radioactive material can be interspersed, as desired, in order to maintain adequate isodose curves. Prior to loading the pellets in the cylinder, the radiation protector 32 is placed around the cylinder 1 to shield the operator. The plunger 4 is inserted in the cylinder 1 and the knurled collar 24 can be tightened sufficiently to cause the washer 26, shown as a split washer, to grip the plunger 4 enough to prevent its accidental withdrawal from the cylinder.

The patient is placed in Fowler's position. The device is held with the aid of the finger holders 5 and the thumb in a position with the distal end uppermost so that the pellets under the action of gravity tend toward the proximal direction and the invaginated balloon 14 remains undisturbed. The cap 20 is removed and the applicator inserted through the vagina and the dilated cervix into the endometrial cavity. The patient is then tilted into the Trendelenburg position and the plunger 4 is depressed forcing the radioactive pellets to expand the balloon 14 and conform to the endometrial cavity, delivering a uniform dosage of radiation to the cavity and tumor. The anti-friction lining 2 of the cylinder 1 serves to facilitate the movement of the pellets in the cylinder.

The plunger 4 is locked in place by the knurled collar 24, the position being indicated by the indicia 6, and the device is packed with rolled gauze in the vagina and left there until an adequate dosage of radiation is delivered. After the instrument has been inserted and packed in place, the patient is placed in a supine position and taken back to her room for a predetermined time of radiation, which may be as long as 18 to 24 hours.

For removal of the device, the patient is placed in Fowler's position so that the proximal end of the cylinder 1 is depressed from the horizontal. The knurled collar 24 is then unscrewed to release the plunger 4. With a finger or thumb placed tightly over the hole in the head of the plunger, the plunger is retracted to its safe limit, at which it can still be firmly gripped by the locking washer 26, and it is there locked in place by the collar 24 to prevent accidental falling out of the plunger completely from the cylinder. The suction created by sealing off the head of the plunger together with the action of gravity and the tendency of the uterus to contract to its normal undistended configuration causes the pellets to travel down the storage cylinder 1 so that the distal T-shaped end of the applicator, the balloon 14, is no longer under pressure. The entire device is withdrawn from the patient by pulling on the finger holders at which time those pellets which may remain in the balloon will be few enough so that the balloon can collapse sufficiently for easy removal through the cervix.

In the case where more than one effective cylinder load of radioactive material is required to expand the balloon sufficiently to fill a large endometrial cavity, the procedure is as follows. First the original storage cylinder 1 is inserted in the manner previously described and its plunger depressed at the time the patient is in the Trendelenburg position to force the original load of pellets 30 into the balloon 14. With the patient remaining in the Trendelenburg position, the plunger 4 is completely withdrawn from the cylinder 1 and the gate 28 is immediately closed as an added precaution, although the maintenance of the Trendelenburg position will insure that the cylinder 1 still inserted in the patient remains with its proximal end elevated to prevent accidental escape of pellets. The knurled collar 24 and split locking washer 26 are removed. The extension 38 with its gate 44 closed, its cylinder 40 loaded with radioactive material, and its plunger 42 locked against accidental escape by collar 50, is screwed onto the proximal threaded portion of the cylinder 1 in the manner shown in FIG. 5. The gates 28 and 44 are opened and the collar 50 released. Under the action of gravity, assisted by the depression of the plunger 42 in the extension cylinder 40, the pellets travel from the extension cylinder into the original cylinder 1. The volume of pellets loaded into the extension cylinder 40 should not exceed the volume displaced by the effective stroke of the plunger 4 in the original cylinder 1. By effective stroke is meant the distance traveled by the plunger 4 from its maximum retracted position, where its distal end is locked at the safety limit line, i.e. where it can still be safely locked by washer 26, to its maximum inserted position where its distal end is essentially flush with the distal end of cylinder 1.

By observance of the aforementioned volume limitation on the new load of pellets, the level of pellets in the original cylinder 1 will be low enough to prevent any danger of them rolling out of the proximal end of the cylinder 1. As a precaution, prior to the next step, which is the removal of the extension 38, the gate 28 is closed. The extension 38 is now unscrewed and removed from the original cylinder 1. After the extension 38 has been removed, the original plunger 4, locking washer 26, and knurled collar 24 are replaced on the original cylinder 1, and the plunger 4 is depressed to force the second load of pellets, to the desired extent, into the applicator 8. The knurled collar 24 is then turned to cause the locking washer 26 to lock the plunger at the desired stopping place. The device is then packed in gauze to retain it in the vagina, the patient is tilted into a supine position and, as previously described, the device is left in position for the time calculated to produce the necessary irradiation.

After the necessary irradiation has taken place, the patient is restored to Trendelenburg position, the knurled collar 24 and the locking washer 26 are removed together with the plunger 4 from the cylinder 1 while the cylinder 1 remains inserted in the patient in Trendelenburg position. Again as a precaution, the gate 28 is closed. The empty extension cylinder 40 is screwed onto the proximal end of the cylinder 1. The plunger 42 is inserted fully into the cylinder 40 and there locked in position by the knurled collar 50 where it will serve as the stop for the pellets to be withdrawn from the applicator. The gate 28 is opened. The patient is tilted out of the Trendelenburg position into Fowler's position where the proximal end of the device is depressed below the horizontal. With a finger over the hole in the head of plunger 42, the plunger 42 is retracted to the safe limit, the knurled collar 50 first having been loosened sufficiently to permit this plunger retraction. At this stage, the knurled collar 50 is again tightened to lock the plunger so that it will safely remain as a stop for the radioactive pellets. Under the action of gravity, the suction of the plunger, and the tendency of the uterus to contract, sufficient pellets will run down the cylinder toward the proximal end to deplete the load of pellets in the balloon 14, enough so that the entire device can readily be withdrawn from the uterus through the cervix.

Although the applicator is illustrated as having its rigid angular stem formed integral with the balloon 14, the stem can, if desired, be made separately. For example, an angular stem, preferably with a flange 16, can be made of stainless steel or plastic or the like and a latex sheath can be slipped over substantially the entire stem portion and the applicator thus formed be fastened by the collar 10 to the distal end of the cylinder 1. A bead on the latex sheath such as is found on finger cots would insure a firm grip by the collar 10. If desired, to insure the expansion under the action of the pellets taking place essentially entirely in the distal portion of the sheath, the proximal portion of the sheath surrounding the rigid stem can be made appreciably thicker than the distal terminal portion. The balloon 14, whether constituted as an integral of the applicator, as shown in the drawings, or as part of a separate sheath just described, can be shaped to especially accommodate the cavity to be irradiated, the illustrated T-shape being particularly suited for the uterus. However, the invention contemplates the use of sufficiently flexible material for the balloon that various shapes can be used so that they will conform to the interior of the cavity even though their uninflated configurations may not resemble that of the cavity.

Although latex is one preferred material, the distensible part of the applicator can be made of any other strong elastic material. As as alternative to the use of radioactive particles or pellets within the applicator, the applicator itself can be made radioactive and inflated as by air or the outside surface of it can be covered with a net of radioactive material, thus in either case establishing a radioactive liner which conforms to the uterine cavity when the balloon is inflated.

Obviously many other modifications and variations of the present invention are possible in the light of the above teachings. It is therefore to be understood that within the scope of the appended claims the invention may be practiced otherwise than as specifically described.

What is claimed is:

1. A device of the character described for irradiating a body cavity, such as the uterus, comprising:
   a cylinder;
   an applicator including
      a relatively rigid tubular stem having its proximal portion fixed to, coaxial with, and in communication with the interior of said cylinder and having the axis of its distal portion at an obtuse angle to the axis of its proximal portion; and
      a distensible, elastic balloon having its proximal region fixed relative to said stem and its interior in communication with the distal end of said stem so that said balloon is in communication through said stem with the interior of said cylinder;
   a plunger telescopically engageable in said cylinder; and
   means on said cylinder for locking said plunger, at various positions of travel, against motion in said cylinder.

2. The device of claim 1 further including a plurality of solid pellets of radioactive material disposed initially in said cylinder for displacement into said applicator by insertion of said plunger into said cylinder.

3. The device of claim 2 wherein said balloon is generally T-shaped to conform closely to the contour of an endometrial cavity.

4. The device of claim 2 wherein said plunger is provided with indicia distributed along its length to indicate the extent of its insertion in said cylinder.

5. The device of claim 2 further including a removable cap for covering the distal end of said stem to retain said balloon in collapsed condition invaginated within said stem.

6. The device of claim 2 wherein said pellets of radioactive material are mixed with solid particles of non-radioactive material to control the dose of radiation to be given to said cavity.

7. The device of claim 2 wherein said plunger is provided with a hole extending lengthwise entirely through said plunger to facilitate the release of air from said cylinder, said hole being of such a size as to prevent said radioactive pellets from entering it.

8. The device of claim 2 further including a gate adjacent the proximal end of said cylinder to close the bore of said cylinder after said plunger has been retracted past said gate.

9. The device of claim 2 further including an envelope of resilient material, containing pellets of radiation-absorbing substance, said envelope being preformed to tend to assume generally the form of a hollow cylinder whereby when said envelope is extended, placed with its inner wall adjacent said first-mentioned cylinder, and then released from its extended configuration, it curls around, and clamps itself to, said cylinder to form a radiation shield.

10. The device of claim 3 further including
    an extension cylinder adapted for attachment to said first-mentioned cylinder for adding radioactive pellets to said first-mentioned cylinder from a supply in said extension cylinder;
    said extension cylinder having fastening means at its distal end and said first-mentioned cylinder having fastening means at its proximal end cooperating with the fastening means on said extension cylinder to join said cylinders coaxially;
    said extension cylinder having a gate adjacent its distal end for retaining material against, and releasing material for, flow out through the distal portion of said extension cylinder; and
    a plunger for telescopic engagement with said extension cylinder.

11. The device of claim 10 further including means for locking said last-mentioned plunger, at various positions of travel, against motion in said cylinder.

References Cited by the Examiner

UNITED STATES PATENTS

| 2,190,384 | 2/1940 | Newman | 128—400 |
| 2,750,517 | 6/1956 | Baum | 128—1.2 |
| 3,095,871 | 7/1963 | Mann | 128—2 |

FOREIGN PATENTS

| 297,350 | 4/1917 | Germany. |
| 678,702 | 7/1939 | Germany. |
| 364,597 | 7/1930 | Great Britain. |

OTHER REFERENCES

"International Abstracts of Surgery," April 1953, pp. 370–372.

RICHARD A. GAUDET, *Primary Examiner.*

LOUIS R. PRINCE, *Examiner.*